March 25, 1969
W. H. MEISEL
3,435,393
NULL ADJUSTER FOR MAGNETICALLY OPERATED TORQUE MOTORS
Filed Jan. 26, 1967
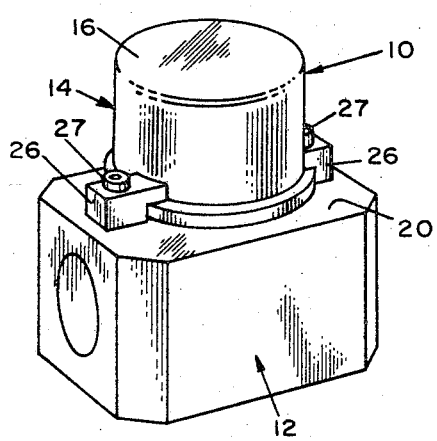
FIG. 1
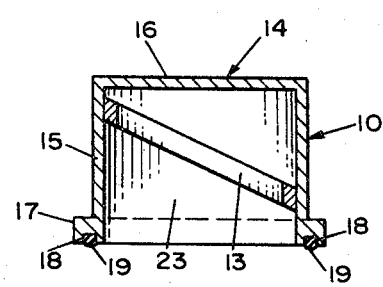
FIG. 3
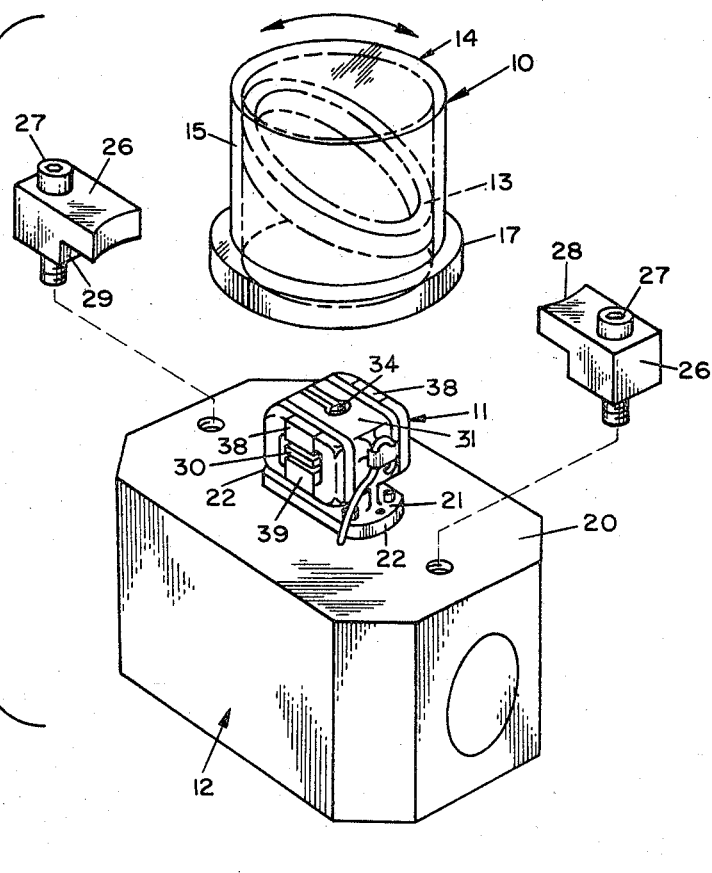
FIG. 2
FIG. 4
INVENTOR.
WILLIAM H. MEISEL
BY
WOOD, HERRON & EVANS

INVENTOR.
WILLIAM H. MEISEL
BY
WOOD, HERRON & EVANS

United States Patent Office 3,435,393
Patented Mar. 25, 1969

3,435,393
NULL ADJUSTOR FOR MAGNETICALLY
OPERATED TORQUE MOTORS
William H. Meisel, Columbus, Ohio, assignor to Abex Corporation, New York, N.Y., a corporation of Delaware
Filed Jan. 26, 1967, Ser. No. 611,990
Int. Cl. H01h 7/00, 7/08
U.S. Cl. 335—237      10 Claims

ABSTRACT OF THE DISCLOSURE

A device for adjusting the null point of a magnetically operated torque motor, including an annulus or loop of magetically permeable material angularly surrounding the torque motor, and a support mounting the loop for adjustably rotating the loop about an axis substantially perpendicular to the axis of the armature.

BACKGROUND OF THE INVENTION

This invention relates to torque motors and, more particularly, to a device for quickly, easily, and accurately adjusting the null point, or no-current operating position, of the armature of a torque motor in a desired balanced or centered attitude, by counteracting or removing the adverse effects of environmental magnetic fields, temperature changes, and manufacturing irregularities.

Generally speaking, a torque motor is an electromagnetic transducer for producing a torque output on an armature proportioned or related to an electric current input. The output torque may be used to actuate and/or control various mechanisms. Torque motors are well known in industry and are widely employed, for example, to control hydraulic and pneumatic servovalves.

One common type of such torque motors has an armature which is angularly displaceable, to a limited degree, in response to a current signal to the motor's control coils. The armature is mounted to a shaft, and it has end portions which are positioned in push-pull relation in air gaps defined between opposed pairs of magnet pole faces. The push-pull relationship is created by permanent magnets which generate magnetic flux across the gaps, this flux being commonly known as the polarizing flux.

The effect of the polarizing flux may be modified by a control flux produced by control coils in the motor when an electric signal is applied to them. The control flux increases the flux in one air gap and decreases it in another; hence the armature is attracted to one of the poles and is repelled by the other, so that it is angularly displaced or turned in the gaps. Such displacement of the armature from its null is opposed by a spring or other biasing means which tends to restore the armature to null; typically this bucking force is sufficiently large that the armature is displaced only over a small arc by the control flux. The position of the armature when no control flux is present, that is, the null point, typically determines the "zero" or no-current operating point of the device controlled by the torque motor. The direction of armature rotation depends upon the polarity of the applied signal, and the torque on the armature varies with and may be proportional to the magnitude of the electrical input.

Because the use of torque motors is very often associated with control functions, such motors must be capable of performing with precision. However, their operation is dependent upon the polarizing flux generated by magnets, and partly because of this, construction of the motors in a manner which insures that the armature will inherently be positioned at the proper null has been found to be rather difficult. This difficulty primarily arises from problems of accurately reproducing and assembling the motor parts. Relatively minor structural differences in the manufacture and assembly of various component parts may cause the armature to be deflected from its proper null position. Such variances, even though slight, tend to create individualistic operating variations for each torque motor, and each motor has had to be tediously and carefully balanced to remove these variations so that the motor will operate at its proper null. Those skilled in the art will recognize that "nulling out" has traditionally been a long, slow and delicate final step in readying torque motors for use, but one which is absolutely critical.

Moreover, even if properly balanced when first assembled, the polarizing flux and, hence the null position of the armature, may be changed by the environmental conditions under which the torque motor is operated. For example, if the torque motor is operated in close proximity to a ferromagnetic metal mass, for example, on a large cast iron machine tool base, the external iron circuit may disturb the polarizing flux path in the motor to such an extent that the armature may be angularly displaced from its proper null without any control flux being generated by the control coils at all. Also, changes in temperature of the operating environment may change the polarizing flux in the motor, thereby affecting the null position of the motor armature.

It has been the primary objective of this invention to provide a null adjuster for "tuning" the polarizing flux present in the torque motor so that the armature may be accurately balanced in the desired null position regardless of slight constructional inaccuracies, operating "drift," temperature changes, or of the ferromagnetic environment in which the motor operates.

BRIEF DESCRIPTION OF THE DRAWINGS

Other objectives and advantages of the invention will be more apparent to those skilled in the art from the following detailed description when taken in conjunction with the acocmpanying drawings in which:

FIGURE 1 is a perspective view of a servovalve operated by a torque motor provided with a null adjuster in accordance with the invention;

FIGURE 2 is a partially exploded view of the component shown assembled in FIGURE 1;

FIGURE 3 is a vertical axial section of the null adjuster;

FIGURE 4 is a perspective view of the ferromagnetic loop of the null adjuster shown in FIGURE 3;

Figure 5:
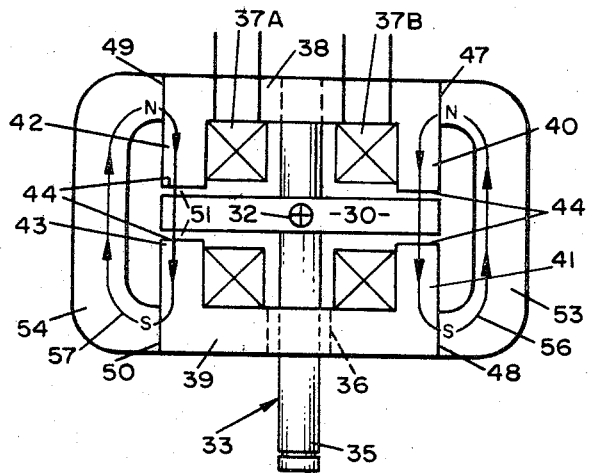
FIGURE 5 is a diagrammatic illustration of a torque motor with the armature in a centered null position, showing the polarizing flux paths.

The null adjuster 10 of this invention is illustrated, in FIGURES 1 and 2, in association with a typical torque motor 11 used to control an electrohydraulic servovalve 12. Although the null adjuster 10 and torque motor 11 are shown here in combination with the servovalve 12, the servovalve is not illustrated in detail as it will be appreciated that the servovalve comprises no part of the invention, and that the null adjuster may be used with torque motors in any number of other operating environments. The structural details of the torque motor and servovalve may be as shown and described in the patent to Atchley, U.S. 2,962,611, to which reference is hereby made.

The null adjuster 10 of the invention basically includes an adjuster ring, loop, or annulus 13 adapted to surround or encircle the torque motor 11 as shown in FIGURES 1 and 2. This ring may comprise a toroid or it may be in the form, as shown, of a diagonal slice of a torque or pipe. Preferably the ring 13 is dimensioned to reside in close proximity to but not touching motor 11, and it is mounted and oriented within a motor housing or cap 14 such that the ring is angularly or diagonally disposed with reference to the motor armature when the cap is placed over the motor 11. As shown in FIGURE 1, the ring 13 may be held within the cap by a suitable adhesive such as, for example, an epoxy cement, or by mounting lugs or other suitable mechanical means. Ring 13 is made of a ferromagnetic "soft" material which provides a relatively low reluctance magnetic flux path, such as soft iron.

The torque motor cap 14 preferably is substantially hat shaped, the hat including a crown portion 15 that is closed at the top as at 16, and a brim or circular flange 17 disposed at the bottom of the crown. Cap 14 may be made of a substantially non-megnetic material such as brass, aluminum, or a plastic. The brim 17 of motor cap 14 is provided on its underside with a groove 18 in which an O-ring seal 19 is seated to form a seal with servovalve body 20 when the cap is secured thereon.

As can be seen from FIGURE 2, the torque motor cap 14, with the adjuster ring 13 fastened inside, is positioned over and around the torque motor 11. The base 21 of torque motor 11 may be provided with curved end or side surfaces 22 to cooperate with the inside surface 23 of motor cap 14 to accurately position the cap with respect to the motor. Sufficient clearance must be maintained, however, between the motor surfaces 22 and the inner cap surfaces 23 to permit gradual rotational movement of the cap 14 relative to the motor 11.

The cap 14 and hence the adjuster ring 13 is maintained in operating association with torque motor 11 by two L-shaped clamps 26, 26. The clamps 26 are shaped to fit over the brim 17 of motor cap 14 and clamp it securely onto valve body 20. The L-clamps 26 may be readily loosened and tightened by threaded fasteners or machine screws 27, thereby permitting the motor cap 14 to be rotated 360° about the axis of the cap. As is described in detail below, such rotational adjustment effectively varies the null point of the armature. The fastener end surfaces are preferably curved to match the radii of curvature of the cap crown and flange surfaces, as at 28 and 29 respectively.

Figure 7:
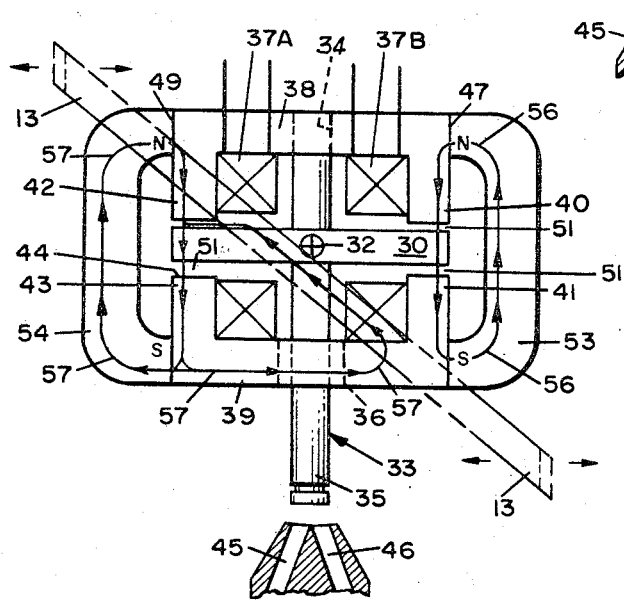
FIGURE 7 is an illustration similar to FIGURE 6 but shows how the null device of this invention alters the flux paths to restore the armature to centered position.

Null adjuster 13 is shown diagrammatically in an operating position around the torque motor in FIGURE 7; for clarity the housing 13 has not been shown in the figure. The particular torque motor 11 shown for purposes of illustration is of the flat armature type which converts a small current differential input into a generally proportional mechanical force or torque output. The torque motor armature 30 is in the form of a bar and is supported by a torsional shaft 32 which is rigidly mounted to the motor frame or base 31. The shaft 32 opposes rotation of armature 30 with a force substantially proportional to the angular deflection, and biases the armature toward the non-deflected position. Control coils 37a, 37b encircle the armature 30. The coils are oppositely wound and have leads which are connected to an amplifier, not shown. For use with the servovalve 12, armature 30 of the torque motor shown is connected to swing or deflect a jet pipe 33 the upper end 34 of which is fixed with respect to the motor base or frame 31, and the lower end of which is laterally displaceable in an aperture 36 to direct a fluid stream toward a pair of receiver ports 45, 46. The impingment of the jet shown on these ports 45 and 46 creates fluid pressures in them which are used to position a main valve (not shown) in known manner.

The torque motor 11 includes C-shaped pole pieces 38, 39 above and below the armature 30. The pole pieces 38, 39 have opposed right legs 40, 41 and left legs 42, 43 (see FIGURE 5) each of which presents a pole face 44 to the adjacent surface of the armature 30 positioned between them. An air gap 51 is defined between each pole face 44 and the adjacent surface of the armature. Affixed to end surfaces 47, 48 and 49, 50 of the pole pieces 38, 39 are polarizing permanent magnets 53, 54 which induce a polarizing flux through the respective pole piece legs 40, 41, 42, and 43 the air gaps 51 and each end of the armature 30. The permanent magnets 53 and 54 are magnetized to produce the polarizing flux paths represented diagrammatically in FIGURE 5 by the lines 56 and 57. A more complete description of a torque motor embodying this construction is disclosed in the patent to Atchley, U.S. 2,891,181.

Under ideal conditions, when no electric current (or no current differential) is applied to coils 37a, 37b, the centering effect of torsional shaft 32 together with the spring effect of jet pipe 33 and the polarizing flux of the magnets moves the armature to a centered null position as shown in FIGURE 5. The null point may comprise a geometric center point, but will typically correspond to the zero or center operating point of the apparatus controlled by the torque motor. For example where, as in the embodiment shown in the drawings, the torque motor operates a jet pipe to control a servovalve, the optimum null position is that position of the armature which will cause the fluid jet discharged from the lower end 35 of the jet pipe to be divided equally between two receiver ports 45 and 46 to thereby maintain the controlled servovalve in a carefully balanced closed or centered position.

However, as previously pointed out, ordinarily a torque motor does not initially operate at or substantially at the optimal null point, and some adjustment is required to achieve such nulling. The problem is to match the null point of the torque motor to the zero point or other desired "no-input" position of the apparatus controlled by the torque motor.

For example, slight dimensional variations in the air gaps 51, or strength variations in the magnetic fields created by permanent magnets 53 and 54, or dimensional variations in the configuration of the armature or in the mounting or biasing effect of the torsion shaft 32 or jet tube 33 may cause the armature to be slightly displaced from the optimum null position, thereby deflecting the jet pipe slightly to the left or the right from the receiver ports which it serves and creating an unbalanced no-signal condition in the controlled servovalve. In the past, to correct such imbalance or imperfect nulling of the torque motor it has been necessary to very precisely reset the torsion shaft, grind the polarizing magnet, or otherwise to incrementally alter the no-current position of the armature.

Figure 6:
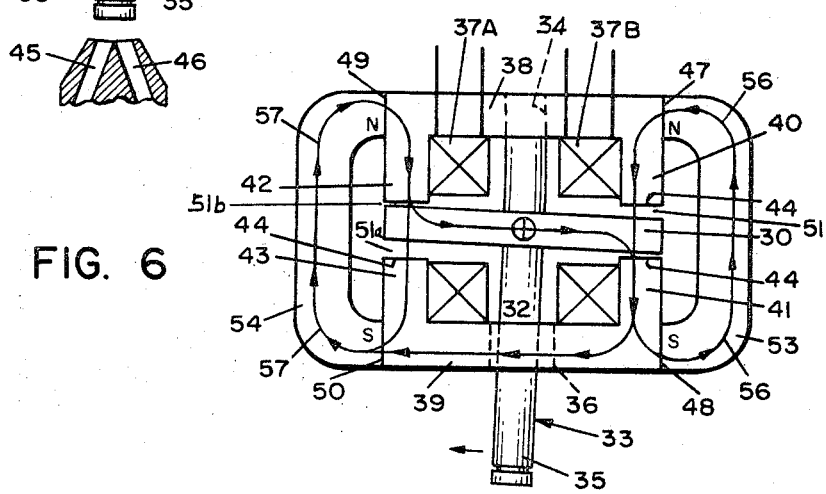
FIGURE 6 is an illustration similar to FIGURE 5 but depicts a torque motor with non-uniform air gap widths, showing the flux paths which result in displacement of the armature from the proper null position.

FIGURE 6 of the drawings shows, in exaggerated fashion, how one kind of unequal dimensioning of the air gaps 51 may cause the armature (and hence the jet pipe 33) to be displaced from an exactly centered null position. In this figure, the air gap 51a between the left armature end surface and the opposing leg 43 of pole piece 39 is larger than the air gap 51b between the armature and the opposite pole piece leg 42. Hence the polarizing flux is in part diverted longitudinally through the armature, to the right leg 41 of pole piece 39, and this causes the armature to tilt to the position shown. The jet pipe therefore directs the larger portion of its jet stream toward receptor port 45, causing valve unbalance.

Without intending to limit the invention to a particular theory of operation, FIGURE 7 illustrates how the encircling loop 13 may counteract or balance out the adverse effect of such unequal air gap dimensioning, so that the armature will reside in a corrected null position. By reason of the diagonal orientation of the loop around the armature, the loop can be turned to come into progressively closer proximity to one of the air gaps at a given end of the armature than to the opposite air gap. As this is done, the flux at the closer air gap is differentially diverted through the ring rather than through the armature, so that the portion of the flux in the air gap between the pole pieces and the armature is balanced on each side.

In addition to offsetting the effect of unequal spacings between the pole pieces, the null adjuster can be used to cancel out the effect on polarizing flux of large ferromagnetic masses near which the torque motor may be positioned. Proper positioning of the ring 13 can also be used, within limits, to compensate for null disturbing effects of operating temperatures that are above or below the recommended range and which may tend to change the polarizing flux in the torque motor, altering the displacement sensitivity of the armature.

The extent to which the flux is diverted or shunted through the ring 13 can be varied progressively by rotating the cap 14, and hence the ring, about its vertical axis. The ring 13 is turned to that orientation empirically necessary to properly null the torque motor. This can be ascertained by observation of the no-current position of the apparatus controlled by the torque motor, or by observation of the operation of the torque motor itself.

It will be apparent that ring 13 need not be symmetrical, although that it is a convenient shape. The ring can be segmented, or cut; it need not comprise a full loop. Its size and position on the motor will of necessity depend to some degree on the specific motor, but should be such that it will modulate the polarizing flux sufficiently to provide the desired degree of adjustment. The angulation of the plane of the loop with respect to the plane of the pole piece end faces is not critically limited to any certain number of degrees, but orientations of about 30 to 60° are believed to be most useful in practice.

Although the cap or housing 14 can be made of nonmagnetic material, it can alternatively be made of a magnetic field shielding material such as "Mumetal," having a high permeability at low field strength and high electrical resistivity, or the equivalent, to insulate the torque motor from external magnetic objects. Under these circumstances the null biasing ring may still be used to compensate for manufacturing, assembly, or other operating variations.

Having described my invention what I claim is:

1. In a torque motor having an armature mounted to a shaft and movable in air gaps from a null position in response to a change in the magnetic flux across said air gaps, said motor also having electromagnetic means for changing the flux across said gaps in accordance with an electrical input signal; adjusting means for changing the null position of said armature in said air gaps, said adjusting means comprising,
a loop of ferromagnetically soft material dimensioned to encircle said motor, said loop being small enough to interact with the magnetic flux in said air gap,
and a support means mounting said loop in such position that said loop will encircle said armature in a plane diagonally intersecting the latter, said support means being adapted to be adjustably oriented around said motor.

2. The null adjusting means of claim 1 wherein said support means is adapted to be rotated around said torque motor about an axis perpendicular to the general plane of said air gap.

3. In a torque motor having an armature mounted to a shaft and movable in air gaps from a null position in response to a change in the magnetic flux across said air gaps, said motor also having electromagnetic means for changing the flux across said gaps in accordance with an electrical input signal;
adjusting means for changing the null position of said armature in said air gaps, said adjusting means comprising,
a loop formed of ferromagnetically soft material,
a housing mounting said loop and surrounding said motor,
said loop being dimensioned to encircle said motor in sufficient proximity thereto to interact with the magnetic flux across said air gaps,
said loop being mounted to said housing so that it lies in a plane extending angularly with respect to said armature,
and means adjustably securing said housing around said motor so that said housing can be moved to alter the orientation of said loop with respect to said air gaps.

4. The adjusting means of claim 3 wherein said loop has the shape of a slice cut diagonally from a pipe.

5. The adjusting means of claim 3 wherein said loop is continuous.

6. The adjusting means of claim 3 wherein said torque motor is of the type having a generally flat armature with end portions disposed in air gaps between opposed pole faces.

7. The adjusting means of claim 6 wherein said loop lies in a plane forming an angle of about 30 to 60° with the plane of said armature.

8. The adjusting means of claim 7 wherein said housing and loop are rotatable about an axis perpendicular to the plane of said armature.

9. The adjusting means of claim 8 wherein said housing forms at least part of a sealed enclosure for said motor.

10. The adjusting means of claim 9 wherein clamps are provided to hold said housing in desired orientation on said motor.

References Cited

UNITED STATES PATENTS

| 3,058,038 | 10/1962 | Stedman et al. | 335—237 XR |
| 3,154,728 | 10/1964 | Bordenet | 335—236 XR |

GEORGE HARRIS, Primary Examiner.

U.S. Cl. X.R.
310—36; 335—230